US009169678B2

(12) United States Patent
Rozema

(10) Patent No.: US 9,169,678 B2
(45) Date of Patent: Oct. 27, 2015

(54) PRESSURE RELIEF LATCH MECHANISM

(75) Inventor: Timothy S. Rozema, Ladera Ranch, CA (US)

(73) Assignee: Hartwell Corporation, Placentia, CA (US)

( * ) Notice: Subject to any disclaimer, the term of this patent is extended or adjusted under 35 U.S.C. 154(b) by 163 days.

(21) Appl. No.: 13/513,631

(22) PCT Filed: Dec. 3, 2010

(86) PCT No.: PCT/US2010/058957
§ 371 (c)(1),
(2), (4) Date: Jun. 4, 2012

(87) PCT Pub. No.: WO2011/069103
PCT Pub. Date: Jun. 9, 2011

(65) Prior Publication Data
US 2012/0242096 A1    Sep. 27, 2012

Related U.S. Application Data

(60) Provisional application No. 61/266,803, filed on Dec. 4, 2009.

(51) Int. Cl.
| E05C 3/04 | (2006.01) |
| E05C 3/08 | (2006.01) |
| E05B 5/00 | (2006.01) |
| E05B 51/02 | (2006.01) |
| E05B 63/00 | (2006.01) |
| B64D 29/06 | (2006.01) |
| E05B 15/04 | (2006.01) |

(52) U.S. Cl.
CPC ... *E05C 3/08* (2013.01); *E05B 5/00* (2013.01); *E05B 51/023* (2013.01); *E05B 63/0069* (2013.01); *B64D 29/06* (2013.01); *E05B 2015/0413* (2013.01); *E05B 2015/0431* (2013.01); *Y10T 292/1083* (2015.04)

(58) Field of Classification Search
USPC .............................. 292/202, DIG. 31, 336.3
See application file for complete search history.

(56) References Cited

U.S. PATENT DOCUMENTS

| 4,365,831 | A | * | 12/1982 | Bourne | 292/229 |
| 4,602,812 | A | * | 7/1986 | Bourne | 292/113 |
| 4,911,485 | A | * | 3/1990 | Wasilewski | 292/139 |
| 5,638,709 | A | * | 6/1997 | Clavin | 70/208 |
| 6,513,841 | B1 | * | 2/2003 | Jackson | 292/214 |
| 6,606,889 | B1 | * | 8/2003 | Tweedy | 70/208 |
| 6,755,448 | B2 | * | 6/2004 | Jackson et al. | 292/113 |
| 8,113,551 | B2 | * | 2/2012 | Baic et al. | 292/113 |
| 2004/0012212 | A1 | | 1/2004 | Pratt et al. | |
| 2005/0087996 | A1 | | 4/2005 | Jackson et al. | |
| 2006/0214431 | A1 | | 9/2006 | Helsley et al. | |

OTHER PUBLICATIONS

Search Report and Written Opinion issued in Int'l App. No. PCT/US2010/058957 (2011).

* cited by examiner

*Primary Examiner* — Mark Williams
(74) *Attorney, Agent, or Firm* — Barnes & Thornburg LLP

(57) ABSTRACT

A latch mechanism for use in attaching portions or panels on an aircraft. The latch mechanism and related method include a detent mechanism for releasably coupling a bolt portion of the latch to a handle portion of the latch. The latch allows the bolt and handle to conjointly pivot with respect to a corresponding mounting bracket. The latch operates to relieve pressure in an excess pressure condition when the forces associated with the detention mechanism are overcome.

16 Claims, 12 Drawing Sheets

PRESSURE RELIEF LATCH MECHANISM

CROSS REFERENCE TO RELATED APPLICATIONS

This application is a U.S. nationalization under 35 U.S.C. §371 of International Application No. PCT/US2010/058957, filed Dec. 3, 2010, which claims priority to U.S. provisional patent application No. 61/266,803, filed Dec. 4, 2009. The disclosures set forth in the referenced applications are incorporated herein by reference in their entireties, including all information as originally submitted to the United States Patent and Trademark Office.

BACKGROUND

The present disclosure relates to a pressure relief latch mechanism for releasably latching and/or holding a first member with respect to a second member, and in particular to a latch mechanism including a manually operable trigger for releasing a bolt of the latch mechanism from a latched condition and that is configured to alternatively automatically release the bolt of latch mechanism from the latched condition in response to an over-pressure condition encountered by the first member.

BRIEF DESCRIPTION OF THE DRAWING FIGURES

DETAILED DESCRIPTION

Figure 1:
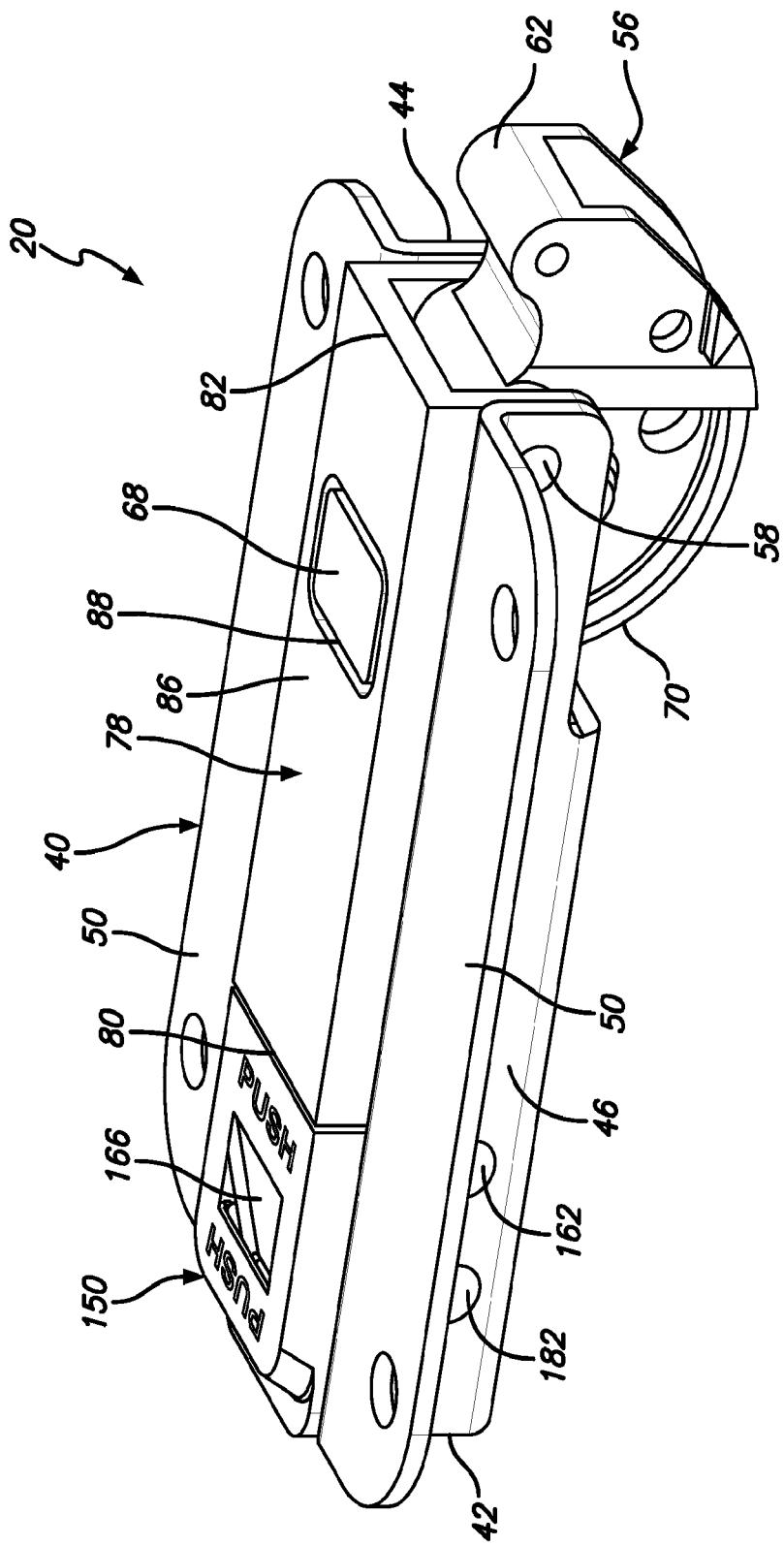
FIG. 1 is a perspective view of the latch mechanism shown in the latched condition.

As shown in the drawing figures, latch mechanism 20 is adapted to releasably latch a first member 22 to a second member 24. First member 22 includes a first surface 26, a second surface 28 and an aperture 30 that extends through first member 22 from first surface 26 to second surface 28. Second member 24 includes a first surface 32 and a second surface 34. Second member 24 may be, for example, an aircraft frame or other body member. First member 22 may be, for example, a door or panel that is adapted to be removed or displaced with respect to second member 24.

Latch mechanism 20 includes a mounting bracket 40 that extends between a first end 42 and a second end 44. Bracket 40 includes a pair of generally planar side walls 46 that are spaced apart and generally parallel to one another. A generally planar bottom wall 48 extends between the bottom ends of side walls 46 and is generally perpendicular to side walls 46, such that the side walls 46 and bottom wall 48 are generally U-shaped and form an open receptacle therebetween. A flange 50 extends outwardly and generally perpendicularly from the top end of each side wall 46. Each flange 50 includes one or more apertures adapted to receive a fastener for use in attaching bracket 40 in engagement with the second surface 28 of the first member 22 in alignment with aperture 30.

Figure 2:
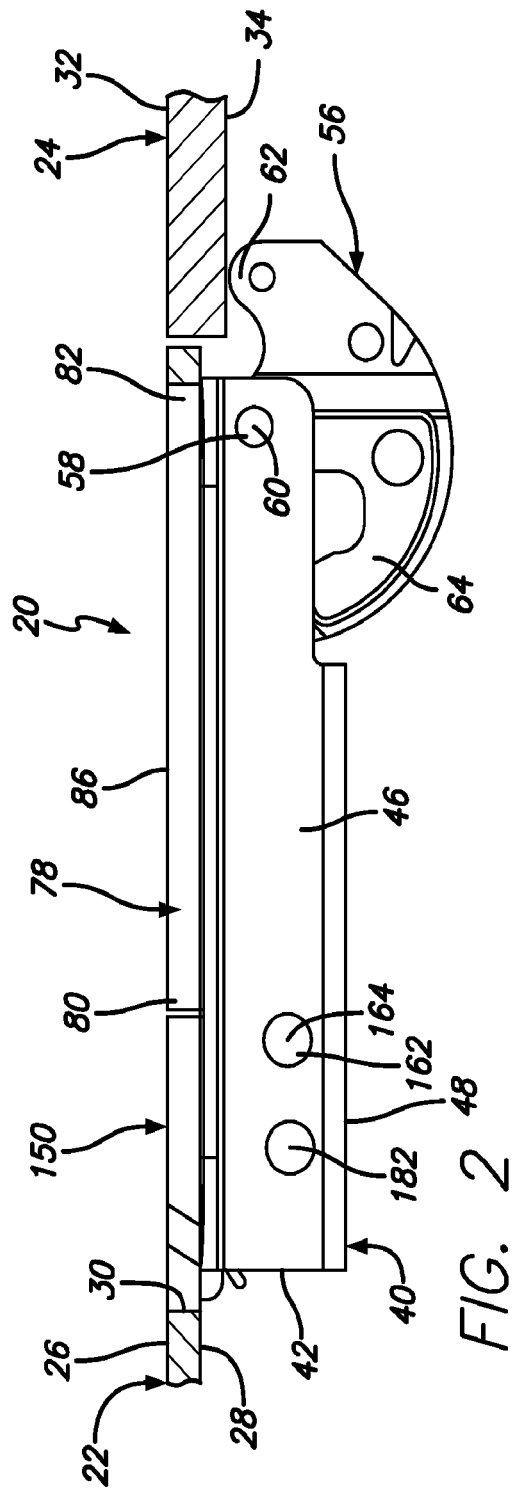
FIG. 2 is a partial cross sectional view of the latch mechanism shown in the latched condition and releasably latching a first member to a second member.
Figure 17:
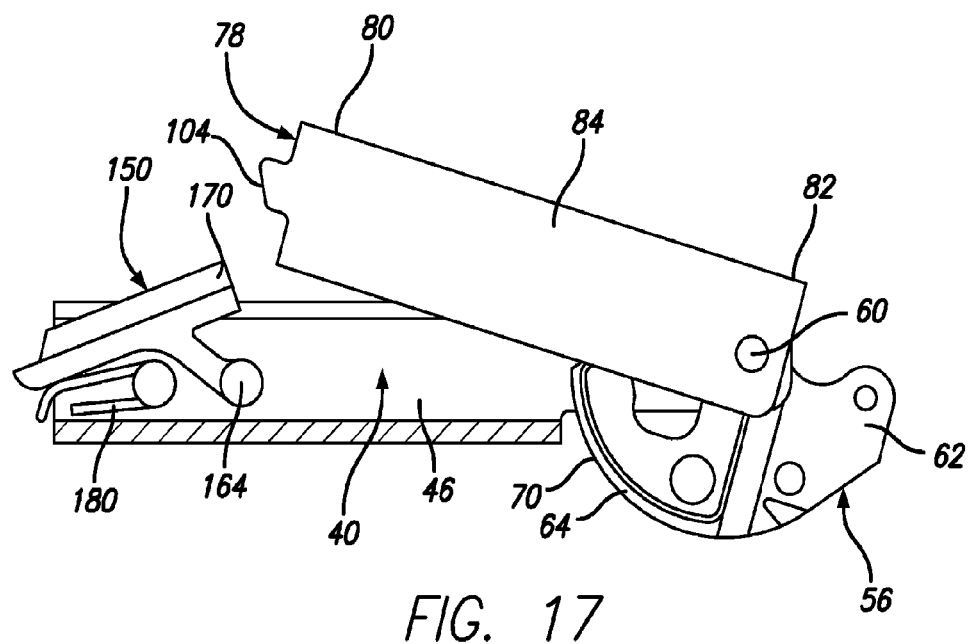
FIG. 17 is a side elevational view of the latch mechanism shown in an unlatched condition with the bolt, handle and trigger in extended positions.
Figure 18:
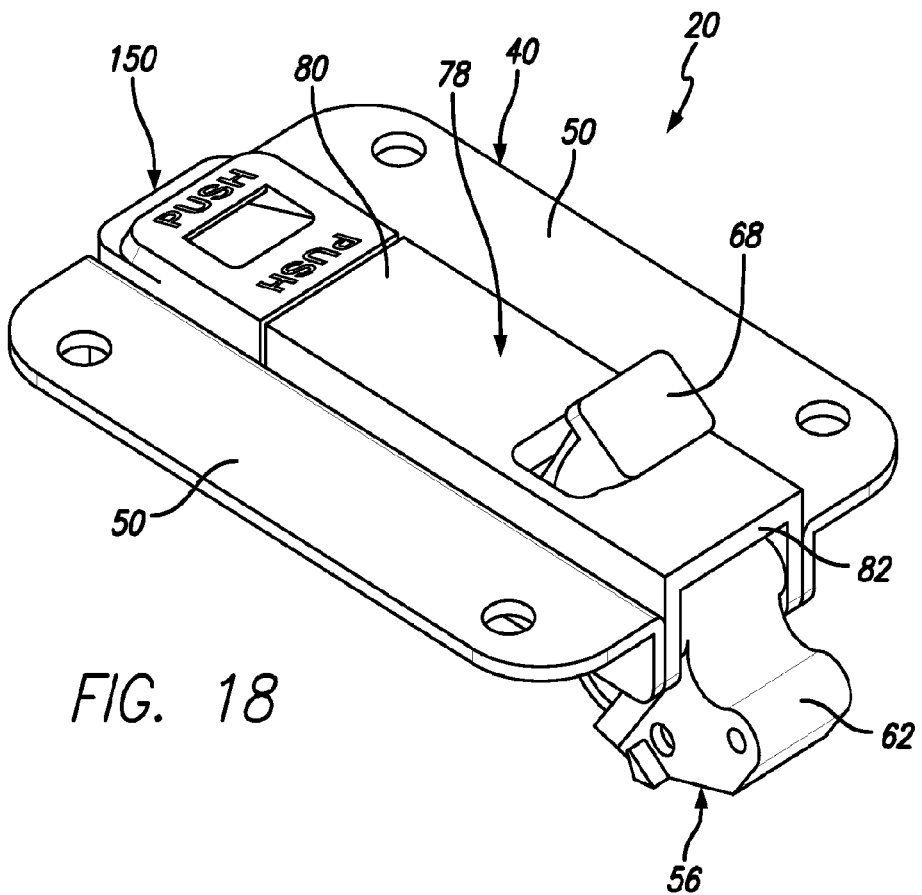
FIG. 18 is a perspective view of the latch mechanism showing the bolt pivoted to an extended position in response to an over-pressure condition such that the latch mechanism is in the unlatched condition while the handle and trigger are in the retracted position.
Figure 19:
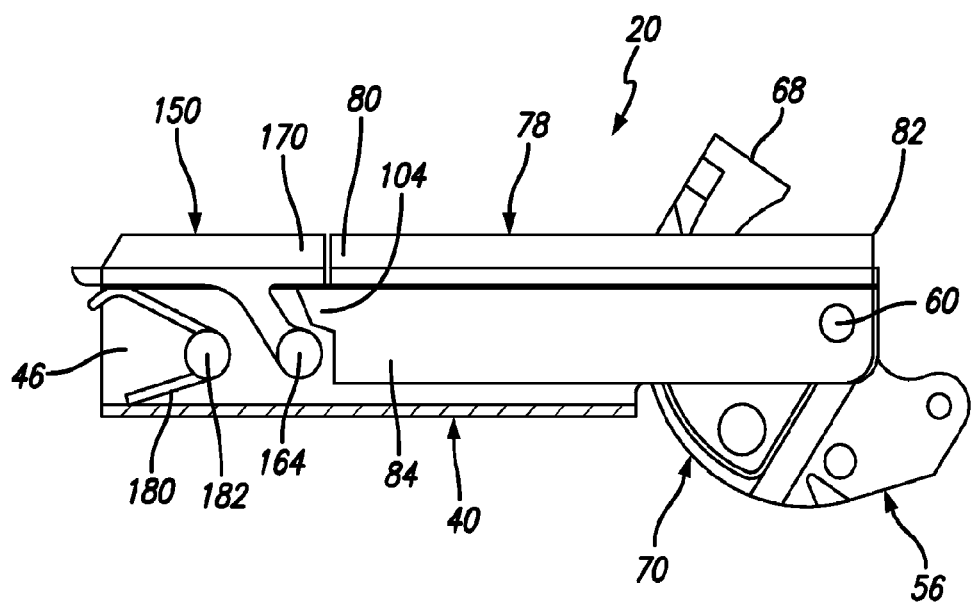
FIG. 19 is a side elevational view of the latch mechanism shown in FIG. 18 with the bolt in the extended position and the trigger and handle in the retracted position such that the latch mechanism is in the unlatched condition.

Latch mechanism 20 includes a bolt 56 pivotally coupled to bracket 40 by a pin 58 having a generally linear central axis 60. Pin 58 extends generally transversely between side walls 46 of mounting bracket 40 and is coupled at each end to a respective side wall 46. As shown in FIG. 2, bolt 56 is in a retracted position with respect to bracket 40 such that latch mechanism 20 is in a latched condition whereby latch mechanism 20 releasably latches first member 22 to second member 24. Bolt 56 is pivotal with respect to bracket 40 about axis 60 from the retracted position as shown in FIG. 2 toward an extended position as shown in FIGS. 17-19, wherein latch mechanism 20 is in the unlatched condition and first member 22 may be removed from, or displaced with respect to, second member 24. Bolt 56 includes an engagement member 62 that is located longitudinally outwardly from second end 44 of mounting bracket 40, such that engagement member 62 is adapted to engage second surface 34 of second member 24 when bolt 56 is in the retracted position and latch mechanism 20 is in the latched condition. Bolt 56 also includes an arm 64 extending between a first end 66 and a second end 68. Arm 64 and engagement member 62 are located on opposite sides of pin 58 and axis 60. Arm 64 includes a convexly curved outer surface 70 that extends between first end 66 and second end 68. A recess or detent 72 is formed in outer surface 70 adjacent second end 68 of arm 64. Outer surface 70 of arm 64 conforms generally to an arc of a circle about axis 60 between second end 68 of arm 64 and detent 72.

Figure 11:
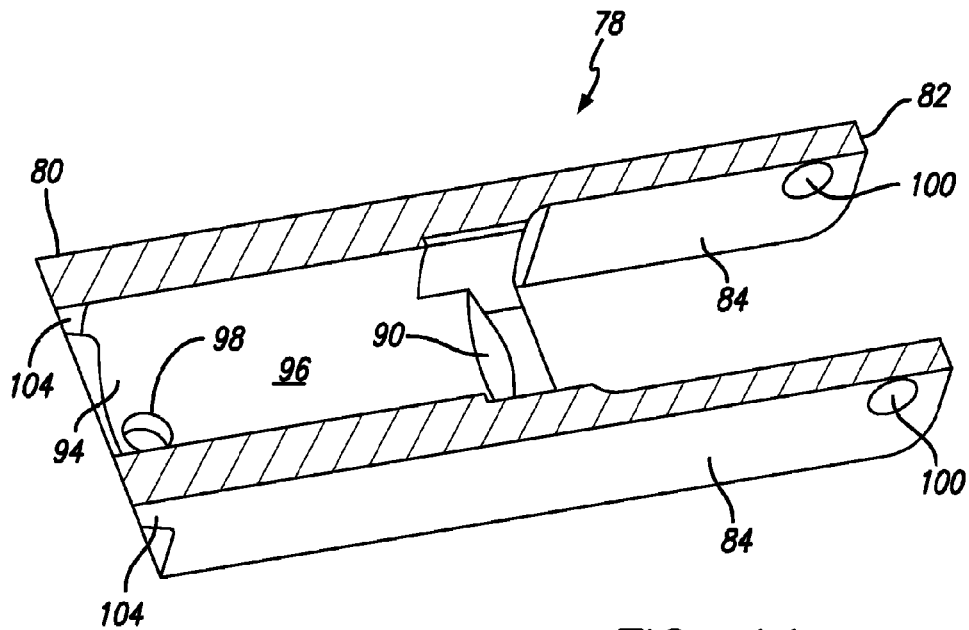
FIG. 11 is a perspective partial cross section view of the handle of the latch mechanism.
Figure 12:
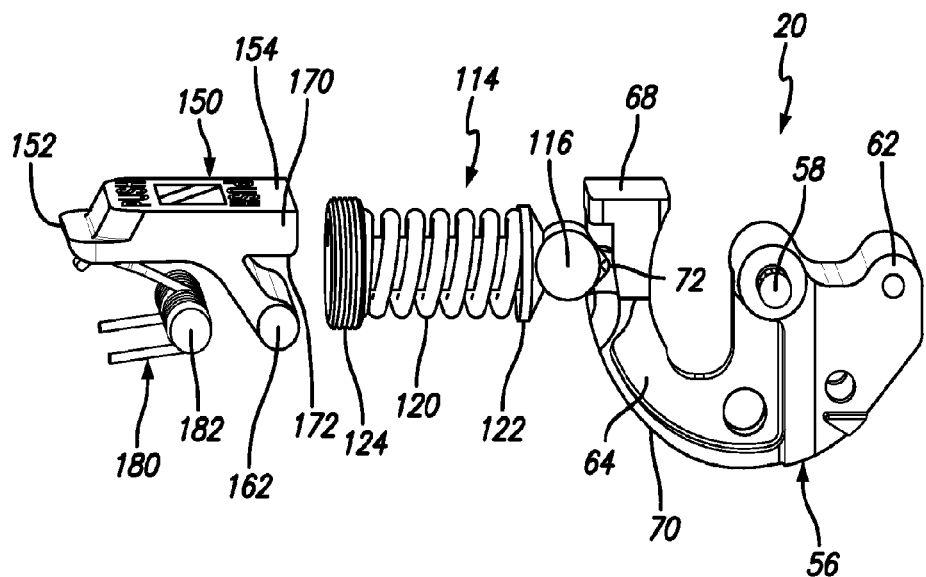
FIG. 12 is a partial view of the latch mechanism showing the trigger, bolt and detent mechanism in the latched condition.
Figure 13:
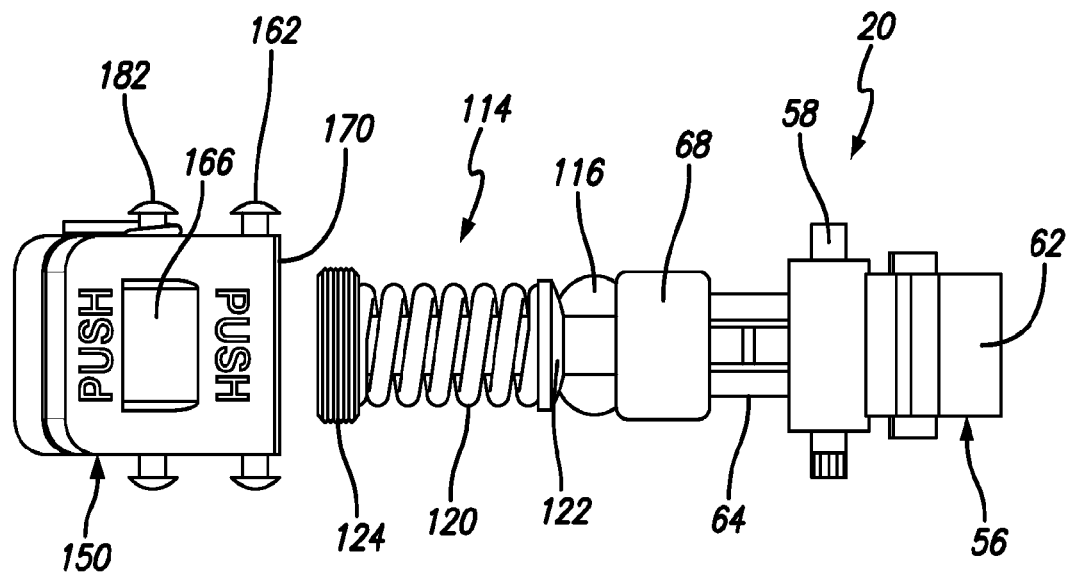
FIG. 13 is a top view of the trigger, bolt and detent mechanism as shown in the latched condition with the handle and mounting bracket removed.
Figure 14:
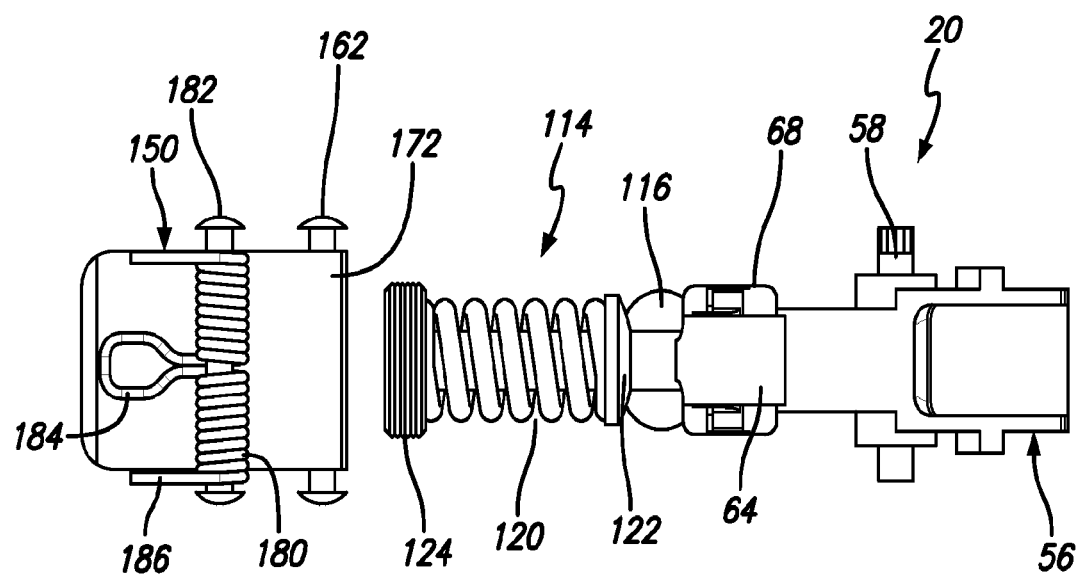
FIG. 14 is a bottom view of the trigger, bolt and detent mechanism shown in the latched condition with the handle and mounting bracket removed.
Figure 15:
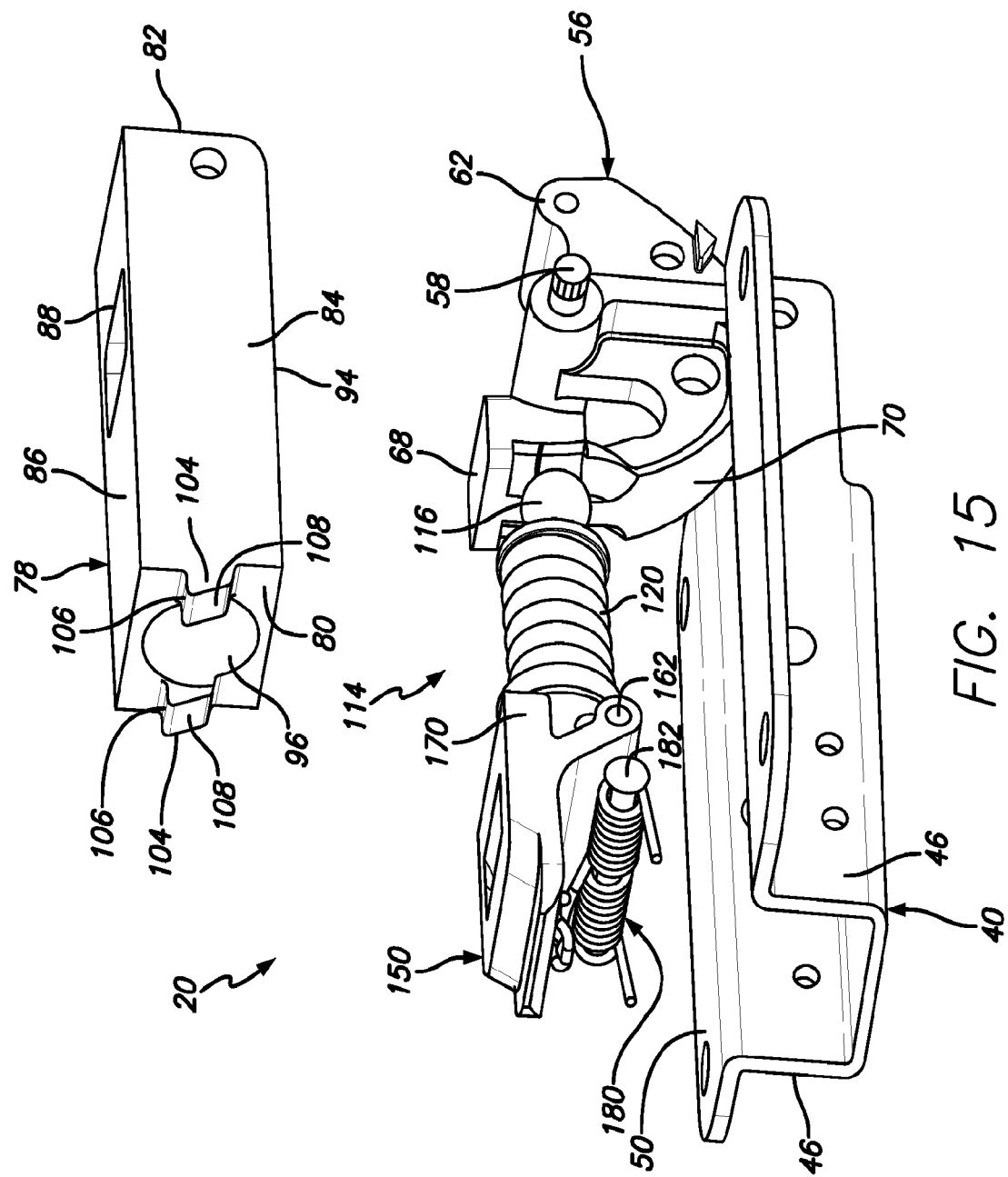
FIG. 15 is a partially exploded view of the latch mechanism.

Latch mechanism 20 includes an elongate handle 78 that extends between a first end 80 and a second end 82. Handle 78 includes a pair of generally planar side walls 84 that are spaced apart and generally parallel to one another. A generally planar top wall 86 extends between the top ends of side walls 84 generally perpendicular to side walls 84, such that side walls 84 and top wall 86 are arranged in a generally inverted U-shaped manner. Top wall 86 includes an aperture 88 configured to receive arm 64 of bolt 56. As shown in FIG. 11, handle 78 includes an internal wall 90 located between first end 80 and second end 82 and that extends generally perpendicular to side walls 84 and top wall 86. Internal wall 90 includes a central generally circular aperture 92. Handle 78 includes a bottom wall 94 that extends between first end 80 and internal wall 90, and between the bottom ends of side walls 84. An elongate generally cylindrical chamber 96 is formed in handle 78 between side walls 84, top wall 86 and bottom wall 94 that extends from first end 80 to internal wall 90. Aperture 92 is in communication with chamber 96. Bottom wall 94 includes an aperture 98 that is communication with chamber 96.

Side walls 84 of handle 78 include an aperture 100 at second end 82. Side walls 84 of handle 78 are located between side walls 46 of mounting bracket 40 with bolt 56 located between side walls 84 of handle 78. Pin 58 extends through apertures 100 of side walls 84 of handle 78 such that handle 78 is pivotally coupled to mounting bracket 48. Handle 78 is pivotal with respect to mounting bracket 40 about axis 60 between a retracted position as shown in FIG. 1, and an extended position as shown in FIG. 17 wherein latch mechanism 20 is in an unlatched condition. A resilient biasing member, such as a torsion spring or a leaf spring, is coupled to handle 78 and resiliently biases handle 78 toward the extended position.

Handle 78 includes one or more retention members 104 at first end 80. A retention member 104 may be respectively located at each side wall 84. Each retention member 104 includes a generally planar top engagement surface 106 and a biasing surface 108 at the outer distal end of the retention member 104. Biasing surface 108 may be generally planar and inclined with respect to a central longitudinal axis 110 of handle 78 or biasing surface 108 may be curved.

Latch mechanism 20 includes a detent mechanism 114 located within chamber 96 of handle 78. Detent mechanism 114 includes a detent member 116 such as a generally spherical metal ball or cylindrical roller. Detent mechanism 114 includes an adjustable biasing mechanism 118 having a resilient biasing member 120, such as a helical coil spring, a plunger 122 and a plug or base member 124. Biasing member 120 extends between a first end 126 and a second end 128 generally concentrically about axis 110. Plunger 120 includes a head 130 having a recess 132 configured to receive a portion of detent member 116. Plunger 120 also includes a generally cylindrical stem extending from head 130 along axis 110. Stem 134 extends within second end 128 of biasing member 124. Base member 124 includes a head 138 and a stem 140 that extends within first end 126 of biasing member 120.

Figure 8:
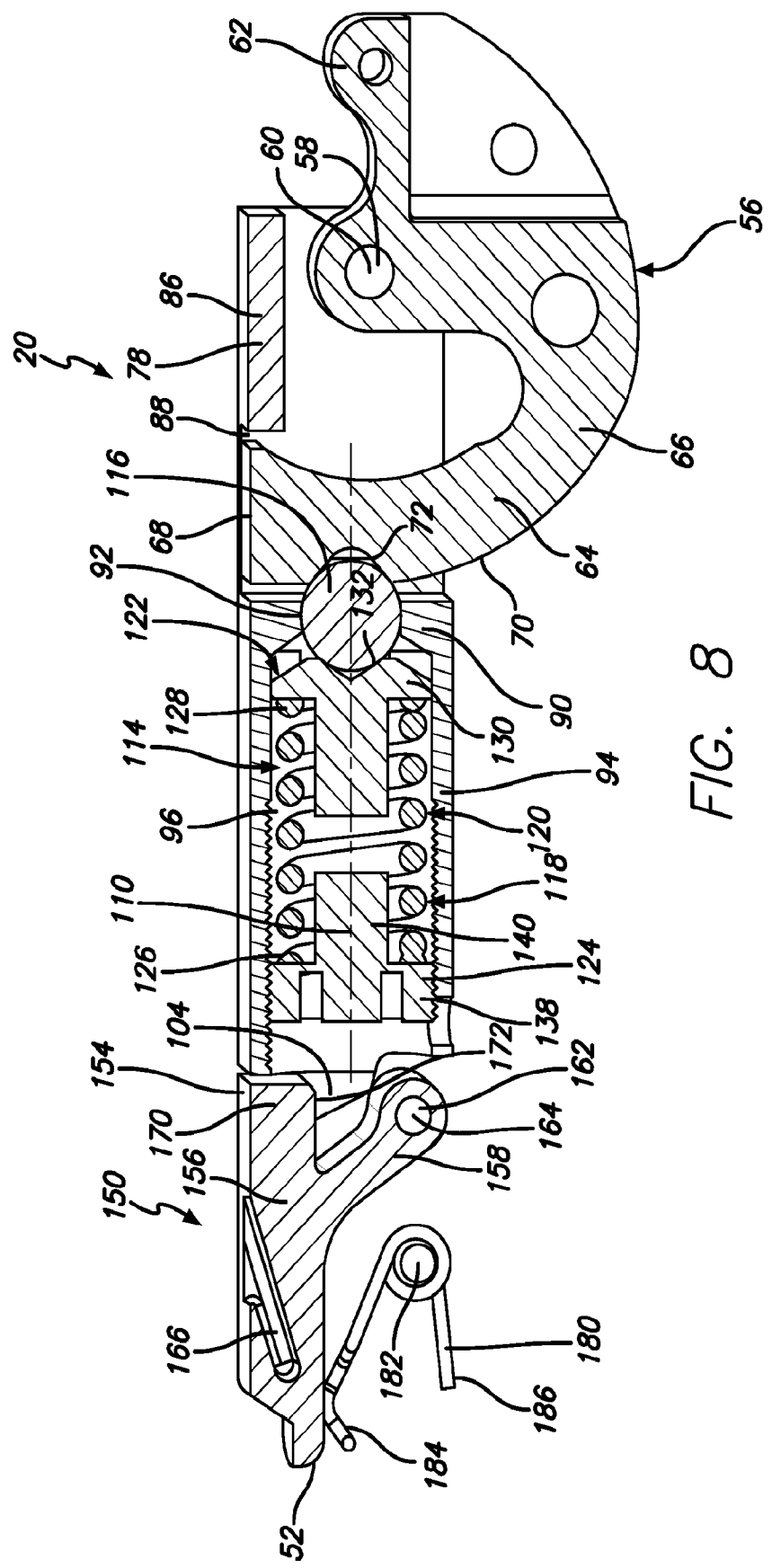
FIG. 8 is a side cross sectional view of the latch mechanism shown in the latch condition with the mounting bracket removed.
Figure 9:
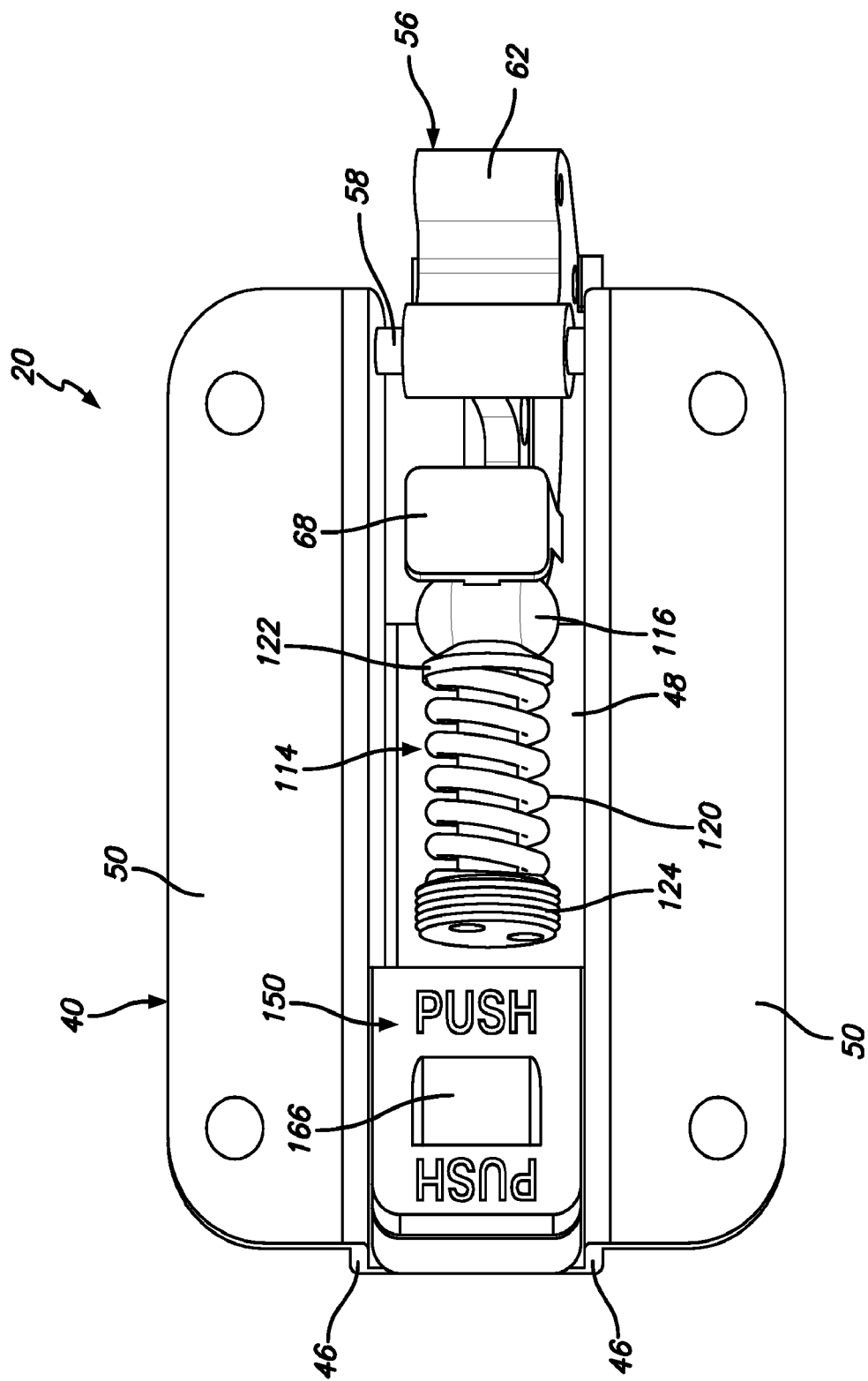
FIG. 9 is a top perspective view of the latch mechanism shown in the latched condition with the handle removed.
Figure 10:
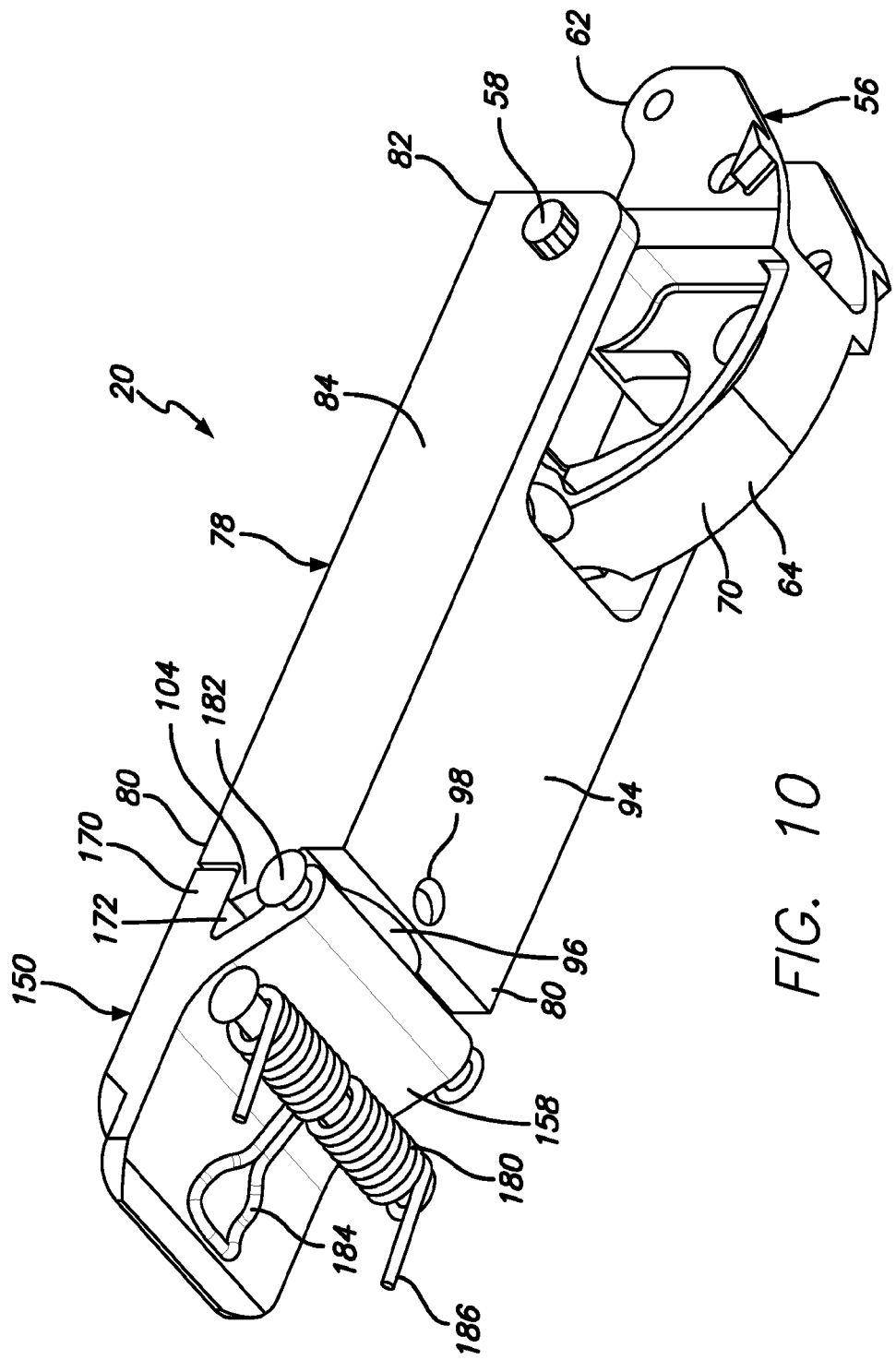
FIG. 10 is a bottom perspective view of the latch mechanism shown in the latched condition with the mounting bracket removed.

First end 126 of biasing member 124 engages an interior surface of head 138 of base member 124, and second end 128 of biasing member 120 engages an interior surface of head 130 of plunger 122. Biasing member 120 resiliently biases plunger 122 into engagement with detent member 116 and thereby resiliently biases detent member 116 toward internal wall 90 of handle 78 and into detent 72 of bolt 56 as shown in FIG. 8. The outer circumferential surface of head 138 of base member 124 threadably engages threads in cylindrical chamber 96 such that selective rotation of base member 124 about axis 110 will move base member 124 along axis 110 in a desired direction to compress or expand biasing member 120 to a desired extent such that biasing member 120 applies a desired force to detent member 116 for engagement with detent 72.

When detent member 116 is in an extended position as shown in FIG. 8, a portion of detent member 116 projects outwardly from aperture 92 of internal wall 90 and is located within detent 72 of arm 64 of bolt 56 to inhibit pivotal movement of belt 56 with respect to handle 74. Detent member 116 thereby releasably locks bolt 56 to handle 78 such that bolt 56 and handle 78 will conjointly pivot with one another about axis 60. However, when a sufficiently large force as applied to engagement member 62 of bolt 56 in a generally downward direction is viewed in FIG. 8, the retention force with which biasing member 120 presses detent member 116 into detent 72 of bolt 56 may be overcome, such that arm 64 of bolt 56 presses detent member 116 toward base member 124 and first end 80 of handle 78 along axis 110 and compresses biasing member 122, such that bolt 56 may rotate in a generally clockwise direction about axis 60 with respect to handle 78 and bracket 40. When detent member 116 is no longer located within detent 72, bolt 56 may pivot about axis 60 with respect to mounting bracket 40 and handle 78 to a retracted position as shown in FIGS. 18-19. Outer surface 70 of arm 64 slides along detent member 116 as bolt 56 pivots about axis 60 between the retracted position as shown in FIG. 8 and the extended position as shown in FIG. 18. Bolt 56 may be manually returned to the position as shown in FIG. 8 with respect to handle 78 by pressing downwardly on second end 68 of arm 64 to pivot bolt 56 in a counter-clockwise direction about axis 60 with respect to handle 78 until detent member 116 is located within detent 72 of bolt 56.

Figure 3:
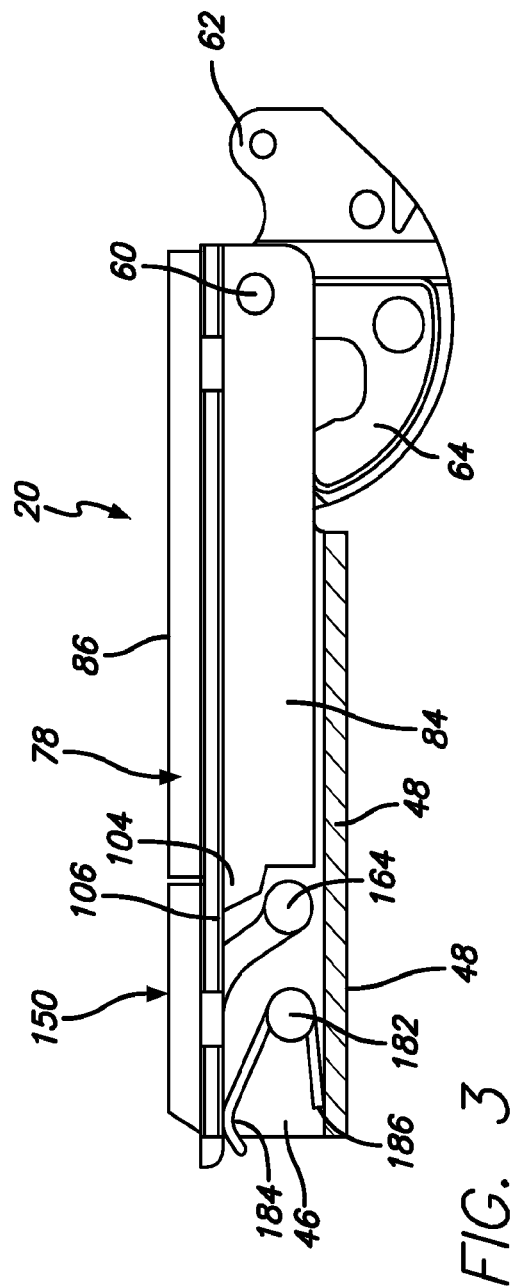
FIG. 3 is a broken-away side elevational view of the latch mechanism shown in the latched condition.
Figure 4:
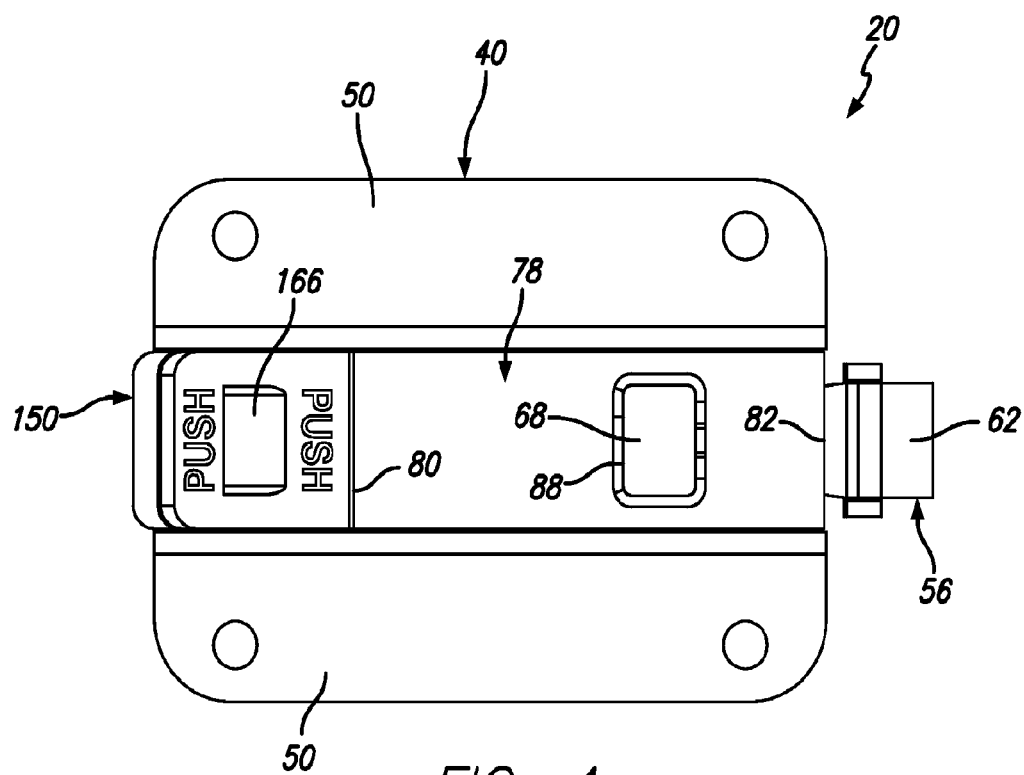
FIG. 4 is a top plan view of the latch mechanism shown in the latched condition.
Figure 5:
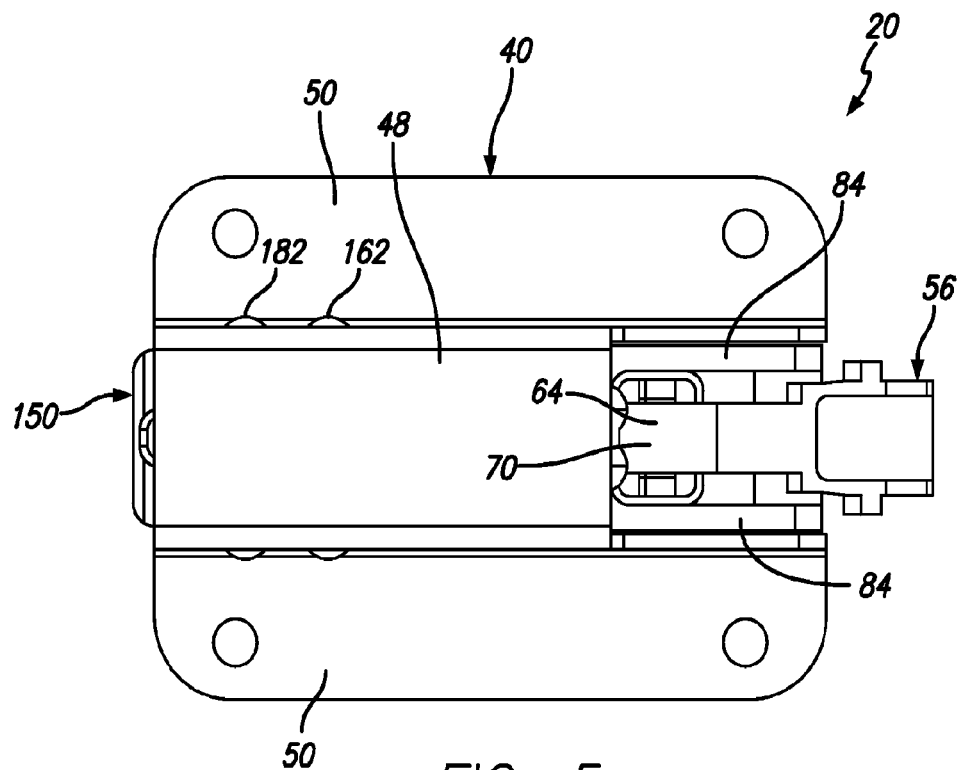
FIG. 5 is a bottom view of the latch mechanism shown in the latched condition.
Figure 6:
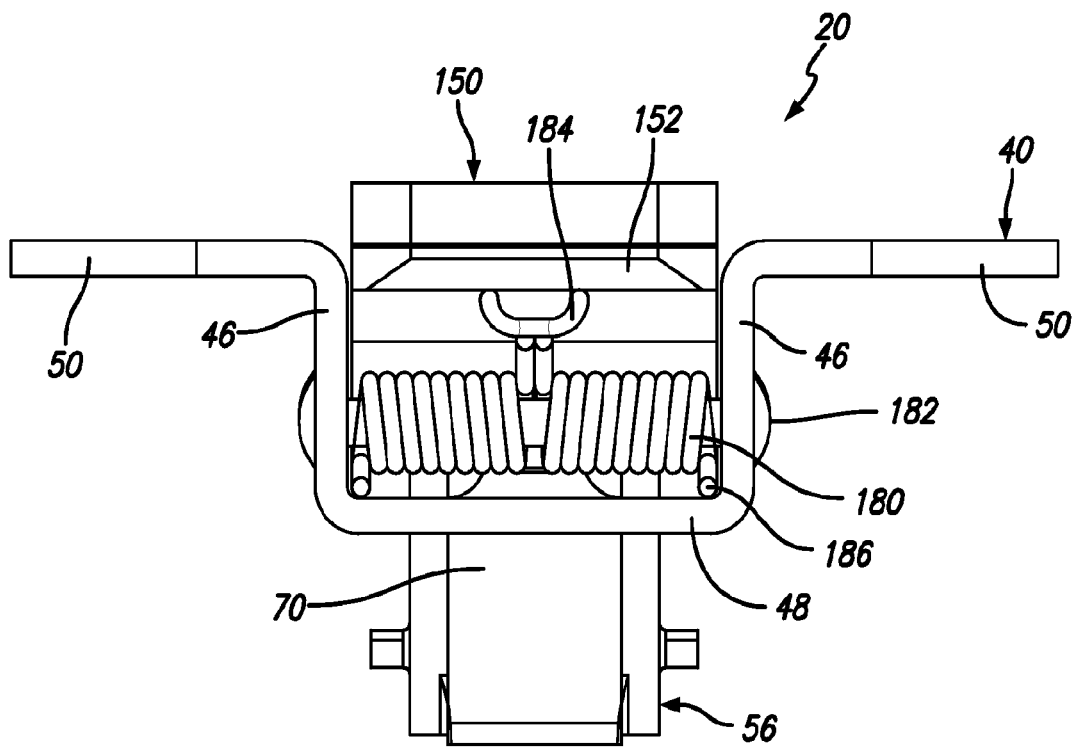
FIG. 6 is a left end view of the latch mechanism shown in the latched condition.
Figure 7:
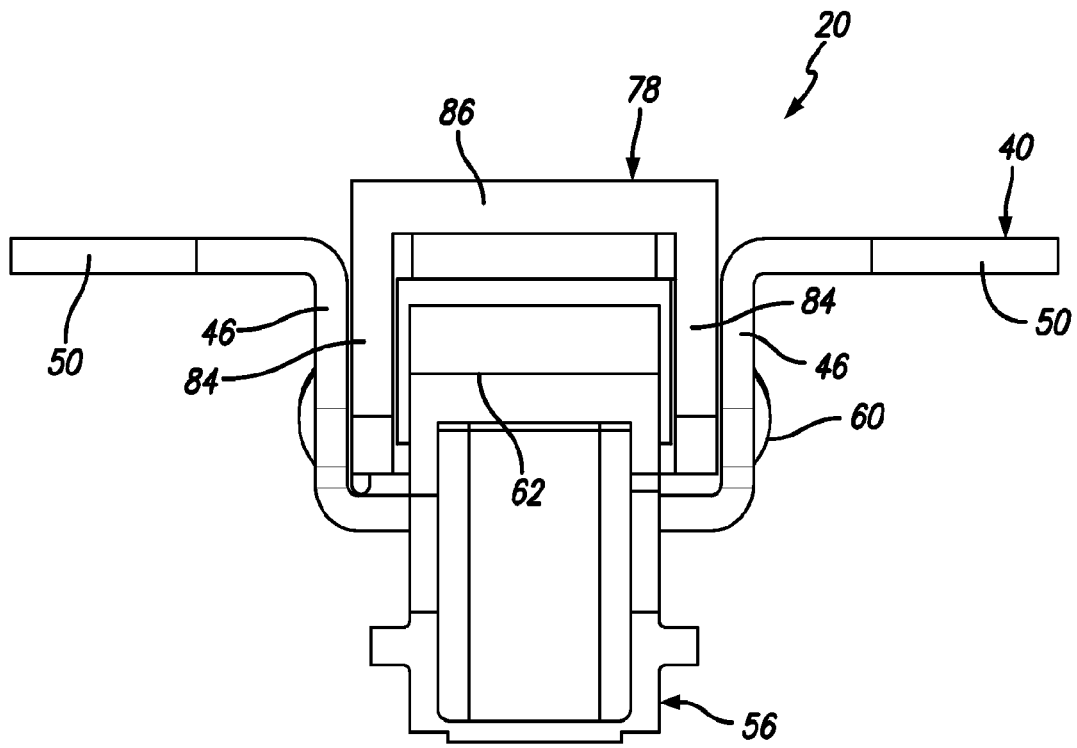
FIG. 7 is a right end view of the latch mechanism shown in the latched condition.
Figure 16:
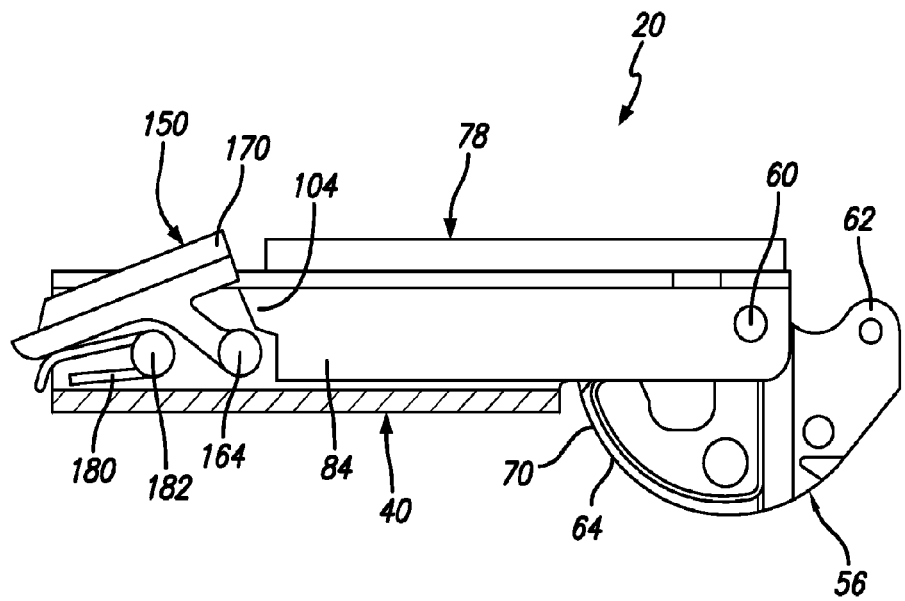
FIG. 16 is a side elevational view of the latch mechanism showing the trigger pivoted toward an extended position and the latch mechanism in an unlatched condition.

Latch mechanism 20 also includes a trigger 150 that extends between a first end 152 and a second end 154. Trigger 150 includes a body 156 and an arm 158 that extends downwardly from the bottom end of body 156. A distal end of arm 158 includes a bore 160. A pin 162 having a central axis 164 extends through bore 160. The ends of pin 162 are coupled to respective side walls 46 of mounting bracket 40. Trigger 150 is located between side walls 46 of mounting bracket 40 and is pivotally coupled to mounting bracket 40 by pin 162 such that trigger 150 is pivotal with respect to mounting bracket 40 about axis 164. Axis 164 is spaced apart from and generally parallel to axis 58 of pin 60. Body 156 of trigger 150 includes an inclined slot 166 that is open at the top surface of body 156. Slot 166 is adapted to receive a tool, such as the tip of the screw driver, to assist in manually pivoting trigger 150 from a retracted position as shown in FIGS. 1 and 8 in a counterclockwise direction about axis 164 to an extended position as shown in FIGS. 16 and 17. Body 156 of trigger 150 includes a locking member 170 having a bottom surface 172 adapted to engage engagement surface 106 of retention members 104 of handle 78 when handle 78 is in the retracted position and trigger 150 is in the retracted position as shown in FIGS. 3 and 8, such that locking member 170 prevents pivotal movement of handle 78 about axis 68 in a generally clockwise direction with respect to mounting bracket 40 when a force is applied to engagement member 62 of bolt 56.

Latch mechanism 20 includes a resilient biasing member 180, such as coil torsion spring. A pin 182 extends between and is coupled to side walls 46 of mounting bracket 40 and couples biasing member 180 to bracket 40. Biasing member 180 includes a first end 184 that is in biased engagement with a bottom surface of body 156 adjacent first end 152 of trigger 150 and a second end 186 that is in biased engagement with bottom wall 48 of mounting bracket 40. Biasing member 180 may be wrapped around pin 182. Biasing member 180 resiliently biases trigger 158 in a generally clock-wise direction about axis 164 from the extended position of trigger 150 as shown in FIGS. 16 and 17 toward the retracted position of trigger 150 as shown in FIG. 3. Trigger 150 is selectively manually pivotal from the retracted position as shown in FIGS. 3 and 8, wherein trigger 150 locks handle 178 in the retracted position with respect to mounting bracket 40, toward an extended position as shown in FIGS. 16 and 17 wherein locking member 170 of trigger 150 is released from retention members 104 of handle 78, such that handle 78 and bolt 56 may conjointly pivot about axis 60 from their retracted positions toward their extended positions whereupon bolt 56 is released from second member 24. First member 22 may then be removed from, or repositioned with respect to, second member 24.

When trigger 150 is manually released, the biasing member 180 will resiliently bias trigger 150 from the extended position to the retracted position. When the handle 178 and bolt 56 are in the extended positions, the handle 78 and bolt 56 may be manually pivoted in a generally counter-clockwise direction about axis 60 by manually pressing second end 80 of handle 78 toward the retracted position. As handle 78 is pivoted toward the retracted position, biasing surfaces 108 of retention members 104 will engage second end 154 of trigger 150 and will pivot trigger 150 in a counter-clockwise direction about axis 164 until retention members 104 pass by locking member 170 of trigger 150. Biasing member 180 then pivots trigger 150 in a clockwise direction about axis 162 such that locking member 170 of trigger 150 engages retention members 104 of handle 78 to thereby releasably lock handle 74 in the retracted position.

In the event an excess-pressure condition is encountered, wherein an excess pressure above a predetermined pressure is applied to second surface 28 of first member 22, which results in a predetermined excess force being applied to engagement member 62 of bolt 56, the excess force will overcome the force with which detent member 116 engages arm 64 of bolt 56 such that the arm 64 of bolt 56 will move detent member 116 along axis 110 in a direction away from bolt 56 and toward base member 124. Bolt 56 will then automatically pivot in a generally clock-wise direction about axis 60 with respect to handle 78 and mounting bracket 40 toward an extended position as shown in FIGS. 18 and 19 whereby engagement member 62 is released from second member 24. Arm 64 of bolt 56 will extend and pass through aperture 88 in top wall 86 of handle 78 as bolt 56 pivots in a clockwise direction about axis 60 with respect to handle 78. First member 22 may be automatically removed from, or repositioned with respect to, second member 24 as a result of the excess-pressure condition, thereby preventing or reducing damage that may otherwise be caused to first member 22 and second member 24. Bolt 56 may be manually reset to the retracted position with respect to handle 78 as shown in FIG. 8 by pressing downwardly on second end 68 of arm 64.

Various features of the invention have been particularly shown and described in connection with the illustrated embodiment of the invention, however, it must be understood that these particular arrangements merely illustrate, and that the invention is to be given its fullest interpretation within the terms of the appended claims.

The invention claimed is:

1. A latch mechanism for releasably latching a first member to a second member, the latch member comprising:
a mounting bracket adapted to be coupled to the first member;
a handle having a first end and a second end pivotally coupled to the mounting bracket, the handle being pivotable about a central axis from a retracted position toward an extended position;
a trigger for selectively locking the handle in the retracted position;
a bolt pivotally coupled to the mounting bracket for pivotable movement with respect to the handle and with respect to the mounting bracket from a retracted position toward an extended position, the bolt including an engagement member adapted to engage the second member; and
a spring, the spring biasing a spherical detent mechanism for releasably coupling the spherical detent mechanism to a recess in an outer surface of the bolt, the outer surface of the bolt formed in a continuously extending arc of at least about 110°, the spring, the spherical detent mechanism, and the recess are configured for coupling the bolt to the handle such that when the trigger is in an unlocked state the bolt and the handle may conjointly pivot with respect to the mounting bracket, and when the trigger is in a locked state and when less than an excess force is applied to the engagement member of the bolt, the bolt and handle are conjointly retained by the trigger in the retracted position,
whereby when the trigger is in the locked state, the spherical detent mechanism is disengageable from the bolt to pivot the bolt independently of the handle when the excess force is applied to the engagement member of the bolt.

2. The latch mechanism of claim 1 wherein the detent mechanism comprises a detent member biased to engage the bolt.

3. The latch mechanism of claim 2 wherein the detent mechanism is adjustable to adjustably bias the detent member to engage the bolt.

4. The latch mechanism of claim 2 wherein the detent member is adjustably biased to move into a recess in the bolt.

5. The latch mechanism of claim 4 wherein the detent member is adjustably biased to move along a longitudinal axis generally perpendicular to said central axis.

6. The latch mechanism of claim 5 wherein the detent member is adjustably biased by a spring to move along the longitudinal axis.

7. The latch mechanism of claim 1 wherein the detent member comprises a ball biased to engage the bolt.

8. The latch mechanism of claim 1 wherein the detent mechanism comprises a plunger having a recess configured to engage a detent member with the detent member being configured to engage the bolt.

9. The latch mechanism of claim 8 wherein the detent member is adjustably biased to move along a longitudinal axis generally perpendicular to said central axis.

10. A method of releasably latching a first member to a second member, the method comprising:
providing a latch mechanism including a mounting bracket adapted to be coupled to the first member;
providing a handle having a first end and a second end pivotally coupled to the mounting bracket, the handle being pivotal from a retracted position toward an extended position,
providing a trigger for selectively locking the handle in the retracted position,
providing a bolt having an outer surface that conforms generally to the arc of a circle, the arc extending continuously along at least about 110° of the circle, the bolt being pivotally coupled to the mounting bracket for pivotal movement with respect to the handle and with respect to the mounting bracket from a retracted position toward an extended position, the bolt including an engagement member adapted to engage the second member, and providing a spherical detent mechanism and a spring, the spring biasing the spherical detent mechanism into a recess in the outer surface of the bolt for releasably coupling the bolt to the handle such that when the trigger is in an unlocked state the bolt and the handle may conjointly pivot with respect to the mounting bracket, and when the trigger is in a locked state and when less than an excess force is applied to the engagement member of the bolt, the bolt and handle are conjointly retained by the trigger in the retracted position, releasing the detent mechanism from the bolt to pivot the bolt independently of the handle when the excess force is applied to the engagement member of the bolt; and pivoting the handle and the bolt conjointly with one another from their retracted positions toward their extended positions to release the bolt from the second member when an excessive less than the excess force is applied and when the trigger is in the unlocked state.

11. The method of releasably latching of claim 10 wherein the step of releasing when an excess force is applied comprises moving a detent member away from a recess in the bolt.

12. The method of releasably latching of claim 11 wherein the step of releasing when an excess force is applied comprises moving a plunger along a longitudinal axis generally perpendicular to said central axis.

13. The method of releasably latching of claim 12 further comprising the step of biasing the plunger to move along the longitudinal axis toward the bolt.

14. The method of releasably latching of claim 13 wherein said excess force is applied to pivot the bolt and to move the plunger along the longitudinal axis away from the bolt.

15. The method of releasably latching of claim 13 wherein the step of biasing uses a spring to move the plunger.

16. The method of releasably latching of claim 12 wherein the plunger includes a recess configured to engage the detent member.

* * * * *